Figure 1:
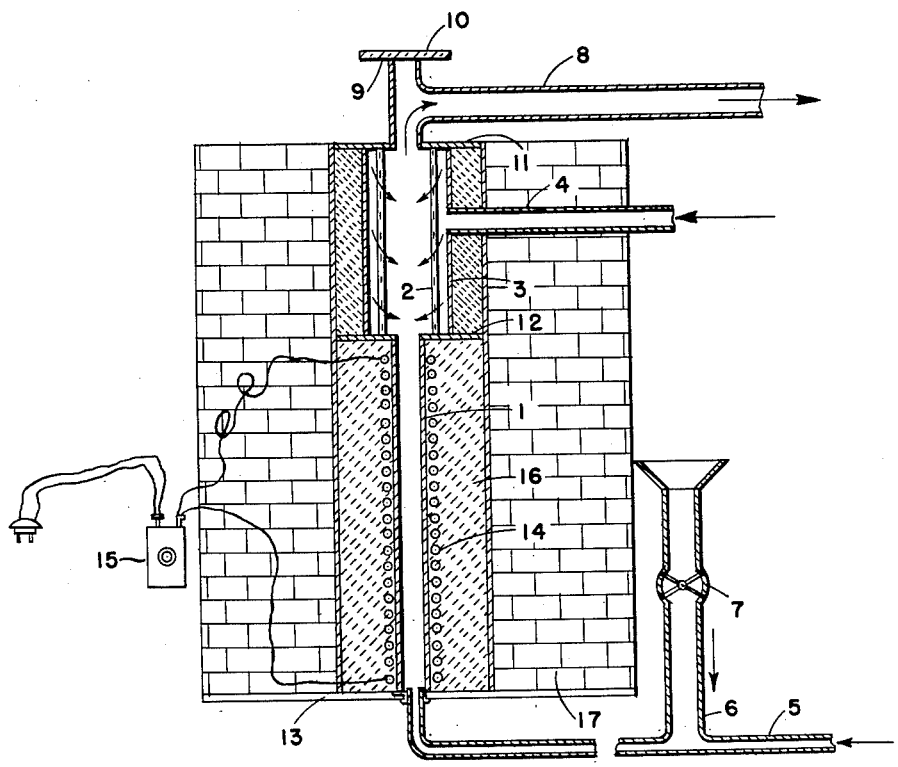

Dec. 4, 1962 E. W. NELSON ETAL 3,067,005
FIXATION OF UNREACTED CHLORINE IN TITANIUM
TETRACHLORIDE MANUFACTURE
Filed July 5, 1957 2 Sheets-Sheet 1

INVENTOR.
EARL W. NELSON
WILLIAM E. TREES
BY

ATTORNEY

INVENTORS
EARL W. NELSON
WILLIAM E. TREES
BY
ATTORNEY 3,067,005
FIXATION OF UNREACTED CHLORINE IN TITANIUM TETRACHLORIDE MANUFACTURE
Earl W. Nelson, Lynchburg, Va., and William E. Trees, Savannah, Ga., assignors to American Cyanamid Company, New York, N.Y., a corporation of Maine
Filed July 5, 1957, Ser. No. 670,264
11 Claims. (Cl. 23—87)

The present invention relates to the fixation of the unreacted chlorine which normally passes from the reaction zone during reaction of oxidic ferrotitaniferous material with chlorine, and particularly relates to a fixation process wherein such unreacted chlorine is converted to ferric chloride by reaction with recycled ferrous chloride.

The invention includes such a process wherein ferrotitaniferous material is chlorinated in fluidized bed form, and unreacted bed particles which are swept or elutriated from the reaction zone by the rising gaseous stream are returned to the bed by condensation of ferrous chloride thereon.

It has long been known that oxide ferrotitaniferous materials (including ilmenite ore concentrates, rutile ore, and ferrotitaniferous slags) can be chlorinated by a process which comprises reacting the ferrotitaniferous material with elementary chlorine in the presence of a carbonaceous reducing agent. The chlorination is generally most efficiently performed by treating the ferrotitaniferous material in the form of a fluid bed at a sufficiently high temperature (800° C.–1100° C. or higher) to chlorinate substantially all of the metallic content of the ore and to convert the metal values to volatile chlorides. In the process, therefore, a crude gaseous stream is formed principally composed of titanium tetrachloride, ferrous chloride, ferric chloride, and carbon dioxide; cf. U.S. Patents Nos. 2,486,912 and 2,701,179.

The stream can be fractionally condensed into its principal components (cf. U.S. Patents Nos. 2,675,889, 2,675,890, and 2,675,891), the ferrous chloride, ferric chloride and titanium tetrachloride respectively condensing in the ranges of about 550°–750° C., 300°–400° C. and 100°–136° C. The molar ratio of ferrous chloride to unreacted chlorine in the stream may be in excess of 2:1.

Numerous trials have shown that the crude gaseous stream of metal chlorides which rises from the reaction bed contains a substantial amount of unreacted chlorine resulting from the tendency of the chlorination gas to pass through the bed in the form of channels, bubbles, "slugs," etc., so that contact between the gas and the ferrotitaniferous particles comprising the bed is incomplete and the stream is non-homogeneous. The off-gas thus has a substantial content of unreacted chlorine.

The method of chlorinating oxidic ferrotitaniferous materials referred to above, as a whole, has a number of disadvantages.

One disadvantage is that the undersize fraction of the fluid bed tends to be swept from the reaction zone in unreacted form by the rising gas stream at normal velocities. A significant loss is sustained when these particles are allowed to go to waste, yet it is costly to recover and return them to the reaction bed.

A second disadvantage resides in the fact that the gaseous stream rising from the bed contains ferrous chloride. Ferrous chloride normally condenses from the gas in the form of adhesive flakes. This (in the absence of special precautions) tends to cause plugging of the upper part of the reactor and the gas discharge duct, requiring periodic shut-downs for cleaning.

Perhaps the most serious disadvantage is the chlorine in the off-gas. Chlorine gas is both costly and toxic, and economical and safe operation of the process has heretofore required that this unreacted chlorine be recovered and recycled. For this purpose, however, a special recovery system has been found necessary.

The discovery has now been made that in the foregoing process unreacted chlorine in the gaseous stream rising from the reaction zone can be "fixed" (i.e., converted to normally solid form) by adding ferrous chloride in particulate form to the stream while the stream has a temperature at which ferrous chloride reacts with chlorine at convenient speed, i.e., a temperature in excess of about 700° C. Preferably ferrous chloride is added by cooling the crude gaseous stream in an upper part of the reactor to a temperature between the snowpoints of the ferrous and ferric chlorides therein. Ferrous chloride condenses and falls towards the reaction zone whereby it combines with unreacted chlorine in the rising gaseous stream fixing the chlorine to ferric chloride form. The ferric chloride at once sublimes and leaves as part of the rising gaseous stream.

We have still further found that when the upwardly rising gaseous stream is cooled for purposes of the present invention, the condensed ferrous chloride tends to condense on the undersize bed particles entrained in the rising gaseous stream, thereby increasing their settling rate.

Under preferred conditions in accordance with the invention we have found it possible to "fix" substantially all of the unreacted chlorine in the rising gas stream as ferric chloride and to return to the bed a major proportion of undersize bed particles that would otherwise be lost.

The invention possesses three principal advantages.

(1) The chlorine may be "fixed" without introduction of any material foreign to the process, so that introduction of contaminants is avoided, and the fixing agent (ferrous chloride) is the material which heretofore caused the most serious plugging difficulties.

(2) The chlorine is conveniently "fixed" as ferric chloride which is normally solid and which therefore can be readily separated from the crude gaseous stream. Moreover, ferric chloride is a combustible salt and regenerates chlorine when reacted with oxygen, so that the invention offers an unusually simple means for recovering and recycling this principal raw material.

(3) The undersized bed particles are returned to the reaction zone in highly discrete, high surface area form in which they are most easily chlorinated and no particular design of apparatus is required. Alternatively, the rate of gas flow through the apparatus may be increased without increasing the amount of bed solids lost.

More in detail, at least part of the unreacted chlorine in such process is "fixed" in normally solid form by cooling the crude gaseous stream from the reaction zone to a temperature between the snowpoint of the ferrous chloride and ferric chloride therein, thereby selectively condensing ferrous chloride, and passing at least part of the thus condensed ferrous chloride towards the reaction zone whereby it reacts with free chlorine converting the chlorine to recoverable ferric chloride form. It is within the scope of the invention to perform the condensation step in a separate chamber, and return the condensed ferrous chloride in any convenient way in whole or in part to the gaseous stream as desired in combination with supplementary ferrous chloride should in any instance the amount condensed be less than that desired.

The present invention is particularly usefully employed in instances where oxidic ferrotitaniferous material is chlorinated in fluidized form in the lower part of a vertical reactor. In such instances the crude rising gaseous stream is advantageously cooled in an upper part of the reactor as described and the speed of the gaseous stream is maintained at a speed below the settling rate of at least part of the condensed ferrous chloride particles whereby at least some of the ferrous chloride is recycled towards the reaction zone. As it descends this ferrous chloride converts unreacted chlorine to ferric chloride as described.

In fluidized chlorinations some bed solids are always entrained in the rising gaseous stream and are thereby swept out of the reaction vessel. The present invention is particularly advantageously used in connection therewith as ferrous chloride condenses on at least part of the entrained particles thereby increasing their settling rate. As a result the present invention has made it possible to return to the bed a substantial proportion of the bed material which otherwise would have been lost, thereby decreasing the load on the solids recovery system and increasing the yield of titanium tetrachloride per unit weight of titaniferous material initially added. The invention includes the step of expanding the cross-section area of the rising gas stream at a point above the reaction zone so as to decrease the velocity of the stream and thereby facilitate the return of bed particles carrying ferrous chloride.

The invention is particularly applicable to the fluid bed chlorination of ilmenite ore concentrate (wherein the weight ratio of FeO to $TiO_2$ is between about 1:2 and 2:1). With this ore the amount of chlorine used and the bed temperature can be restricted so that a high ratio of ferrous chloride can be maintained in the rising gas stream. It is readily feasible by these means to maintain the molar ratio of ferrous chloride to ferric chloride in excess of 1:2. Condenation of this large amount of ferrous chloride while maintaining a gas velocity such that about half is recycled generally results in conversion of substantially all the unreacted chlorine in the rising gas stream to ferric chloride and a major part of the entrained bed particles are returned to the reaction zone. The amount of ferrous chloride which is normally returned is usually sufficient to decrease loss of bed material and chlorine to very low values, or permit the upward gas velocity to be substantially increased without increasing the amount of bed carry-over.

The crude gaseous mixture may be cooled to condense ferrous chloride in any convenient way and the invention does not depend on the method selected or where the cooling is performed. Most simply the cooling is performed in an upper part of the reactor by direct admission of a comparatively cold gas (e.g., nitrogen, carbon dioxide, titanium tetrachloride, ferric chloride or system noncondensibles), or an inert liquid (e.g., liquid titanium tetrachloride, titanium tetrachloride-ferric chloride slurry, and silicon tetrachloride). We have found that condensation of ferrous chloride is sharp and that substantially all is condensed when the gaseous mixture is cooled to 600°–550° C.

The amount of chlorine which is fixed in preferred embodiments depends in part upon the velocity of the rising gaseous mixture. The velocity should be maintained at such rate that at least part of the condensed ferrous chloride particles settle towards the reaction zone. Control of this flow rate is one means for regulating the amount of chlorine fixed and the amount of elutriated bed material returned.

The amount of ferrous chloride produced in the chlorination can be controlled by a variety of means. Thus decreasing the dwell time of the chlorine in the reaction zone favors formation of ferrous chloride, as does nonuniform admission of chlorine gas, the formation of gaseous bubbles and slugs in the rising gas stream, decreasing the temperature of the bed, and increasing the ratio of carbonaceous reducing agent to ferrotitaniferous material.

The proportion of ferrous chloride which is returned towards the reaction zone after condensation in an upper part of a vertical reactor principally depends on the average diameter of the ferrous chloride particles produced, and the velocity of the rising gaseous stream.

We have found that enlarging the upper part of the reactor tends to decrease the speed of the rising gaseous stream and increase the size of the ferrous particles produced, thereby increasing the proportion of ferrous chlorde returned.

The invention does not depend upon the particular way in which the oxidic ferrotitaniferous material is chlorinated, and known methods may be generally used. In practice, we have found that very satisfactory results follow when a reaction zone temperature of about 900° C. is maintained under fluidized conditions, an ilmenite:carbon ratio in the bed is maintained at about 4:1 by weight, the feed is ground to 100% −65, 95% +200 mesh size, the reactor gas is cooled to about 550° C. in an upper part of the reactor by a spray of liquid titanium tetrachloride, and chlorine is supplied in amount sufficient to effect complete fluidization of the bed so that use of diluent gases are avoided. The invention, however, includes the use of chlorine in admixture with auxiliary gases such as nitrogen and carbon dioxide as diluents and oxygen or air to supply additional heat.

Figure 2:
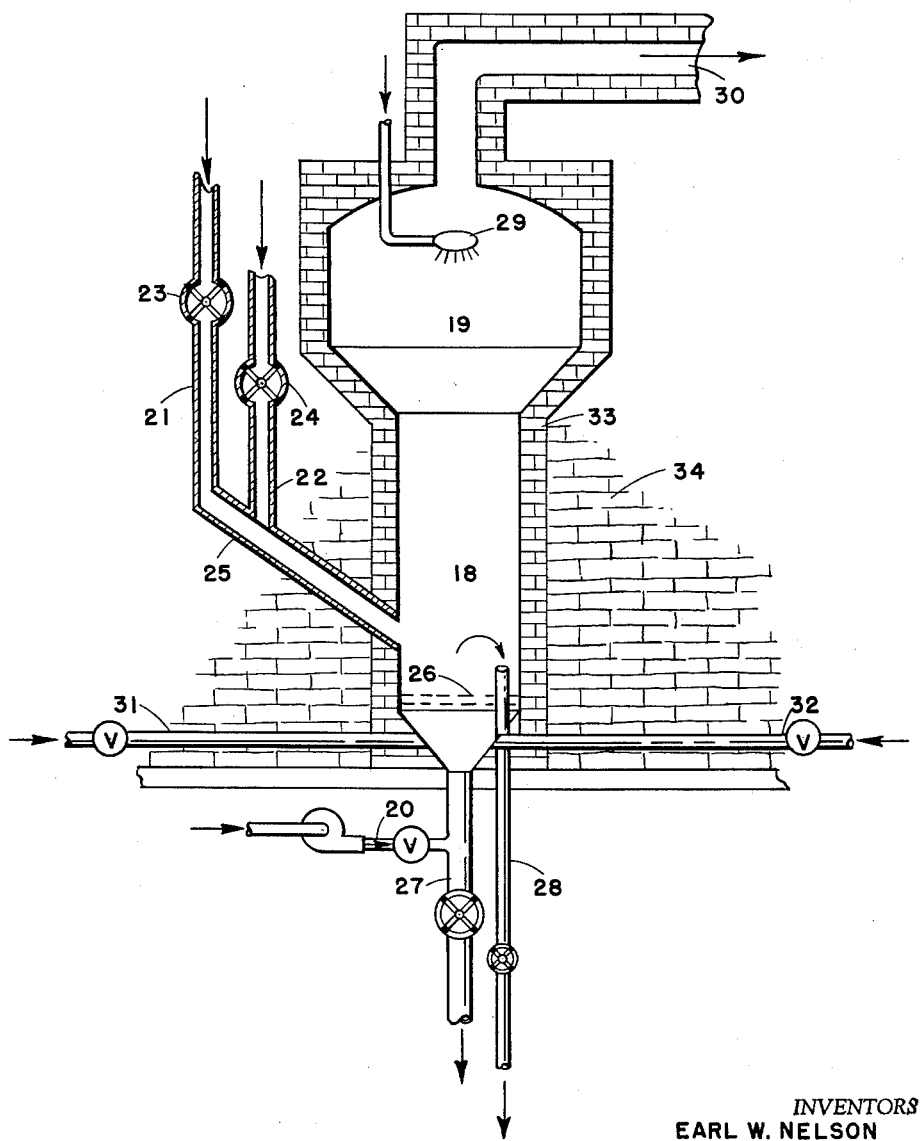

The reaction conditions referred to above can be varied widely within the scope of the invention and the variables can be most conveniently studied by laboratory or pilot plant trial. Suitable apparatus for studying such variations are shown in the drawings wherein:

FIGURE 1 represents a schematic vertical section of a laboratory reactor employing gas as sole condensing agent for the ferrous chloride; and FIGURE 2 represents a schematic vertical section of pilot-plant reactor suitable for performance of the present invention, employing a liquid as condensing agent.

The apparatus of FIGURE 1 consists essentially of vertical non-porous silica reaction tube 1 about 1.5″ in diameter and 30 inches long comprising the reaction zone; vertical porous Alundum tube 2 about 2 inches in diameter and 18 inches long positioned directly above and in register with the reaction tube thereby defining the condensing-settling zone; non-porous silica tube 3 jacketing tube 2 and provided with purge gas supply tube 4, chlorination gas supply tube 5 about 0.5 inch in diameter from which rises vertical ore feed pipe 6 containing star feeder 7; gas exhaust tube 8 provided with sight port 9 closed with silica disc 10; non-porous perforated Alundum discs 11 and 12 respectively sealing the top of the apparatus and separating the condensing-settling zone from the reaction zone; perforated Alundum plate 13 defining the bottom of the reactor tube; and electrical heating coils 14 energized from variable power source 15. The whole is encased in thermal insulation 16 and 17.

The apparatus off-gas passes to a suitable gas handling system such as a ferric chloride condenser, bag filter, titanium tetrachloride condenser, and chlorine analyzer in series (not shown), whereby the ferric chloride, titanium tetrachloride and chlorine are separately recovered.

FIGURE 2 represents a reactor adapted to the practice of the process on a larger scale. The apparatus comprises reaction chamber 18, condensing-settling chamber 19, valved chlorination gas supply pipe 20, tubes 21 and 22 containing star feeders 23 and 24 manifolded to main solids feed pipe 25 for delivery of titaniferous material and coke to the reaction zone, openable grate 26 adapted when in normal closed position to support a fluidized bed of oxidic ferrotitaniferous material, bed discharge pipe 27, bed sampling pipe 28, sprayhead 29 adapted to cool the rising gaseous stream in the upper part of the chamber to a temperature below the condensation point of the ferrous chloride therein; gas discharge duct 30, and valved pipes 31 and 32 adapted to supply auxiliary heating gases, diluent gases, or gases for other purposes. The apparatus is constructed of non-porous Alundum brick 33 and is encased in thermal insulation 34.

Reaction chamber 18 may advantageously be 10 inches in diameter and 5 feet high, and condensing-settling chamber 19 may be 20 inches in diameter and 3 feet high.

The device of FIGURE 1 is first preheated electrically to 1,000° C. Coke and nelsonite ore concentrate in 1:4 weight ratio are then charged through viewing port 9 in amount sufficient to form a static bed 12″ high, and chlorine gas at room temperature is admitted through pipe 5 at such rate as to expand the bed to a height of about 18 inches. A reaction gas is produced containing at least several percent of chlorine by volume as well as considerable ferrous chloride. Sufficient cold nitrogen gas is then passed through tube 4 to decrease the temperature of the off-gas to 650° C. or less thereby condensing substantially all of the ferrous chloride in the gas. At this point flakes of condensed ferrous chloride (white flakes suspended in a reddish gas) can be seen by looking down through view port 9. Bed height is maintained by charging additional solids as needed through star feeder 7. The rate of flow of nitrogen gas through the wall of porous liner 2 is increased as necessary to prevent adhesion of ferrous chloride thereto. At this point the system is in equilibrium and is in condition for study of the effect of variations.

The reactor of FIGURE 2 is prepared for operation by charging coke of operational particle size to a static height of 4 feet and burning carbon monoxide and oxygen (admitted through pipes 31 and 32) until the temperature of the lower part of the reaction zone is about 1,000° C., nitrogen being supplied through line 20 as needed to fluidize the coke.

Ilmenite ore concentrate assaying 45% $T_1O_2$ and 38% Fe is then added to increase the bed height by about one foot. Flow of the heating gases and nitrogen are discontinued and chlorine gas is admitted as necessary through line 20 to continue fluidization and maintain the bed temperature at 900° C. Production of a crude gas containing titanium tetrachloride, ferrous chloride, ferric chloride and unreacted chlorine takes place at once. Substantially all the ferrous chloride is condensed by cooling the rising gas stream to 600° C. by spraying titanium tetrachloride through sprayhead 29, care being taken to position the sprayhead and to deliver the liquid titanium tetrachloride in sufficiently finely divided form that the inner walls of condensing-settling chamber 19 remain at a temperature above the condensation point of ferrous chloride (approximately 700° C.). The amount of chlorine fed through pipe 20 is increased so that a small amount is detected in the off-gas. The chlorine feed rate is then decreased slightly (or the bed temperature or bed height increased) so as to decrease the chlorine loss to a negligible value.

The system is now in equilibrium for study of variables. Under the foregoing conditions the process operates continuously for long periods of time.

Preliminary estimates of the amount of materials to be supplied can be most conveniently made by taking the desired rate of production of titanium tetrachloride as the starting point. The amount of chlorine required for this production can then be calculated as well as the amount of oxidic ferrotitaniferous material which need be supplied. The amount of coolant gas or liquid needed to condense ferrous chloride can then be calculated based upon the volume of the gaseous stream and its assumed temperature and the normal condensation temperature range of 550° C.–650° C.

The invention will be more particularly illustrated by reference to the examples which follow. These examples form and a major proportion of the bed undersize not to be construed as limitations thereon.

*Example 1*

The following illustrates the chlorination of ilmenite (nelsonite) ore concentrate under conditions such that substantially all of the chlorine is fixed in ferric chloride form and a major proportion of the bed undersize particles in the rising gas stream (which would otherwise be lost) are returned for chlorination. The apparatus used corresponded to that of FIG. 1. The chlorination zone was a silica tube 1.5 inches in diameter and 30 inches long, and the condensing-settling zone was constructed of a Norton Co. RA-98 porous Alundum tube 2 inches in diameter and 18 inches long.

The gas discharge tube was connected to a ferric chloride condenser followed by a bag filter where solids (ferric chloride, ferrous chloride and undersize bed particles) were removed at 140° C. The titanium tetrachloride was the condensed and collected at about 110° C. The noncondensibles from the titanium tetrachloride condenser were tested periodically for free (unreacted) chlorine.

In starting up, the lower (reactor) tube was preheated to 700° C. by means of the electrical windings and the upper section was preheated to 550° C. by hot nitrogen gas passed into the space between the porous tube and its jacket.

There was then charged into the reactor tube through the upper opening 120 gm. of a mixture of 10% calcined petroleum coke and 90% ilmenite ore concentrate concentrate containing 45% by weight of titanium calculated as $TiO_2$ and 39% by weight of iron calculated as Fe. The mixture conformed to the particle size distribution curve: 100%—65 mesh, 95%+200 mesh.

A chlorination gas at room temperature consisting of 50% $Cl_2$, 30% $N_2$, 15% $CO_2$ and 5% $O_2$ (all by volume) was fed through the bottom of the silica tube at a rate sufficient to fluidize the bed, i.e., at the rate of about 1.5 liters per minute (S.T.P.). This gas was intended to reproduce the gaseous mixture typically resulting from combustion of titanium tetrachloride with oxygen using carbon monoxide as auxiliary heat source and nitrogen as diluent.

The temperature of the off-gas was controlled at 550° C. by regulating the amount and temperature of the nitrogen supplied through the porous liner so as to condense substantially all the ferrous chloride present in the gas as it rose to the top of the tube. The formation of ferrous chloride could be observed by removing the cover and peering down, the condensed ferrous chloride being clearly visible as white snowflakes in a reddish vapor. The speed of the rising gas stream was controlled so that an estimated half (and perhaps three-quarters) of the condensed ferrous chloride "snowflakes" fell back towards the reaction zone.

The temperature of the fluid bed was then slowly raised until the off-gas gave less than 0.1% chlorine by volume, showing close to 100% utilization of the chlorine. At this point the bed temperature was 850° C. The temperature was held at this value and the run continued for five hours.

As the run proceeded additional portions of ilmenite-coke mixture were fed into the chlorine feed as needed to maintain the bed at a static height of 12 inches, and additional coke was added as necessary to obtain complete fixation of the chlorine.

Data as of the end of the run were as follows: total solids consumed, 488 gm. (of which 63 gm. was coke); total iron chlorides collected (ferrous chloride+ferric chloride), 685 gm.; titanium tetrachloride collected, 150 gm.; and total bed solids swept out of reactor, 4.0 gm. (0.8% of the solids bed). The bed solids in the chlorinator after completion of the run assayed as follows: $TiO_2$, 61.2%; Fe, 21.5%; and C, 8.0%.

The porous walls of the condensing-settling chamber were entirely free of ferrous chloride incrustations.

*Example 2*

The following illustrates another method of operating the process so as to fix substantially all of the chlorine in the reactor.

The starting and ferrous chloride condensation procedure of Example 1 was repeated in the same apparatus, with the following exceptions.

At the outset, the temperature of the reactor tube was raised to 900° C. by the electrical windings. Sufficient ilmenite was then charged, without carbon, to give a static bed height of 10 inches. Flow of the chlorination gas was then started so as to fluidize the bed. Coke was then added in increments of 2 gm. and the chlorine content of the off-gas determined after each addition. When this content fell to substantially zero (showing substantially total chlorine fixation), the composition of the fluid bed was determined. This was found to be 5 parts by weight of carbon to 95 parts by weight of ferrotitaniferous material. Material in this ratio was thereafter employed to maintain bed height, and the run was continued for 3.5 hours without changing the temperature of the bed.

Data as of the end of the run were as follows: total solids fed 355 gm., of which 40 gm. was coke; titanium tetrachloride collected, 93 gm.; iron chlorides collected, 500 gm.; solids swept from reactor, 3 gm. (0.84% of charge). The bed residue after the run assayed as follows: $TiO_2$, 60.0%; Fe, 26.0%; and C, 4%. As in the case of Example 1, the reactor and porous upper section of the tube were completely free from iron chloride deposits, and precipitation of ferrous chloride has decreased loss of solids to a negligible value while substantially preventing any loss of chlorine.

*Example 3*

A method of ensuring substantially total fixation of chlorine by varying the rate at which chlorine is supplied is illustrated by the following.

The procedure of Example 1 was repeated in the same apparatus except that the chlorinating gas feed consisted of 80% $Cl_2$, 15% $CO_2$ and 5% $O_2$ (all by volume), and was admitted at the rate of 1.5 l./min. (S.T.P.). The chlorine was then gradually replaced with nitrogen until the discharge gas from the titanium tetrachloride condenser showed practically zero chlorine content. The composition of the gas at this point was 46% $Cl_2$, 34% $N_2$, 15% $CO_2$, and 5% $O_2$ by volume. The run was continued with this gas for 4 hours.

Data as of the end of the run were as follows: total solids fed, 384 gm. (of which 49 gm. was coke); titanium tetrachloride collected, 174 gm.; iron chlorides collected, 522 gm.; and feed solids carried out of the reactor, 1.7 gm. (equal to 0.45% of the feed). The bed residue assayed $TiO_2$, 57.8%; Fe, 26.1%; and C, 7.6%.

There was no iron chloride deposit in the lower or upper part of the apparatus.

*Example 4*

The following illustrates the pilot plant manufacture of titanium tetrachloride according to the present invention in apparatus similar to that of FIGURE 2.

The reaction (lower) zone of the apparatus is 10 inches in diameter and 5 feet high, and the condensing-settling (upper) zone is 20 inches in diameter and 3 feet high. The upper part of the reactor contains a sprayhead through which titanium tetrachloride-ferric chloride slurry can be fed as coolant. Both chambers are constructed of non-porous Alundum brick and the whole is encased in 2 feet of thermal insulation. The effluent duct is similarly insulated and leads to a ferric chloride condenser followed by a bag filter (for separation of bed solids, ferric chloride, ferrous chloride, etc.). The gas from the bag filter passes to a titanium-tetrachloride condenser and then to a sampling apparatus for determination of its unreacted chlorine content by the starch-potassium iodine method.

In starting up, the lower (reaction) zone is charged to a fluid height of 4 feet with powdered coke ground to a particle size distribution range such that 100% passes through a 65-mesh screen and about 95% is retained on a 200-mesh screen. The reaction zone is then pre-heated to 800° C. by combustion of carbon monoxide and air. Nelsonite (ilmenite) ore concentrate is then supplied in amount equivalent to a fluid height of 6″ and a 75%:25% by volume chlorine:nitrogen gaseous mixture at room temperature is supplied through the bottom of the reactor as combined aerating and reagent gas at the rate of about 11 cubic ft. per minute (S.T.P.). This rate of flow is sufficient to convert the bed to fluidized form. Production of titanium tetrachloride begins at this point. Sufficient of a 20% by weight slurry of ferric chloride in anhydrous liquid titanium tetrachloride is sprayed into the upper part of the condensing-settling (upper) chamber through the rotating sprayhead to decrease the temperature of the off-gas to 550° C. and the temperature of the gas is further decreased to 140° C. just ahead of the bag filter by spraying in pure titanium tetrachloride. The amount of chlorine in the off-gas falls to a negligibly low value.

The run is continued without substantial change in conditions. The carbon content of the bed is periodically determined. Ilmenite is added continuously as needed to maintain the expanded height of the bed at about 4.5 feet until the carbon content of the bed falls to 20% by weight. Thereafter, ilmenite and coke is added in approximately 4:1 weight ratio at a uniform rate to maintain the expanded bed height at 4.5 feet. The amount of carbon is varied as required to hold the content of the bed substantially constant at the 20% value.

Under these conditions the off-gas remains substantially free from chlorine and the reaction proceeds continuously at substantial equilibrium.

We claim:

1. In a process for producing titanium tetrachloride wherein an oxidic ferrotitaniferous material is reacted with chlorine and a carboniferous reducing agent in a reaction zone in a lower part of a vertical reactor to form a crude non-homogeneous gaseous stream comprising titanium tetrachloride, ferric chloride, a substantial amount of ferrous chloride and unreacted chlorine which rises to a discharge orifice in an upper part of said reactor, the method of fixing at least a substantial part of said unreacted chlorine which comprises (1) cooling said gaseous stream in said upper part of said reactor to a temperature between the condensation points of the ferrous chloride and the ferric chloride therein thereby condensing at least a substantial amount of said ferrous chloride, and (2) maintaining the speed of said upwardly-rising gaseous stream below the settling rate of at least a part of said condensed ferrous chloride whereby ferrous chloride falls towards said reaction zone and during said fall fixes unreacted chlorine as ferric chloride.

2. A process according to claim 1 wherein the ferrotitaniferous material is ilmenite ore concentrate.

3. A process according to claim 1 wherein the gaseous stream is cooled at least in part by a spray of liquid titanium tetrachloride.

4. A process according to claim 1 wherein the gaseous stream is cooled at least in part by direct admission of a cold inert gas.

5. A process according to claim 1 wherein the gaseous stream is cooled sufficiently to condense substantially all of the ferrous chloride in said mixture.

6. In a process wherein an oxidic ferrotitaniferous material is reacted with chlorine and a solid carboniferous reducing agent in a reaction zone in a lower part of a vertical reactor to form a crude non-homogeneous gaseous stream comprising titanium tetrachloride, ferric chloride, ferrous chloride and unreacted chlorine which rises to a discharge orifice in an upper part of said reactor, the molar ratio of the ferrous chloride to the unreacted chlorine in said stream being in excess of 2:1, the method of fixing substantially all of said unreacted chlorine in ferric chloride form which comprises (1) cooling said gaseous stream in an upper part of said reactor sufficiently to condense substantially all the ferrous chloride therein but insufficiently to condense ferric chloride, and (2) maintaining the upward flow rate of said gaseous stream at such velocity that condensed ferrous chloride settles to said reaction zone in amount substantially equivalent to said unreacted chlorine.

7. A process according to claim 6 wherein the oxidic ferrotitaniferous material is reacted in fluidized form.

8. In a continuous process wherein an oxidic ferrotitaniferous material in fluidized bed form is reacted with chlorine and a solid carboniferous reducing agent in a lower part of a vertical reactor to form a crude non-homogeneous gaseous stream which comprises titanium tetrachloride, ferric chloride, a substantial amount of ferrous chloride and entrained particles of the fluid bed which rises to a discharge orifice in an upper part of said reactor, the method of returning at least part of said particles to said bed which comprises cooling said gaseous stream in an upper part of said reactor to a temperature between the condensation points of the ferrous chloride and ferric chloride therein thereby condensing ferrous chloride on said entrained particles whereby the settling rate of said particles is increased, and maintaining the upward flow rate of said gas stream at such velocity that at least part of said particles carrying said ferrous chloride settle towards said bed.

9. In a process wherein an ilmenite ore concentrate in fluid bed form is heated with a stream of chlorine in the presence of a carbonaceous reducing agent in a lower part of a vertical reactor to form a crude non-homogeneous gaseous stream principally composed of titanium tetrachloride, ferric chloride, ferrous chloride and unreacted chlorine and entrained particles of the fluid bed which rises to a discharge orifice of an upper part of said reactor, the method of fixing unreacted chlorine in said rising gaseous stream in ferric chloride form and simultaneously returning a major part of said entrained particles to said bed, which comprises maintaining the molar ratio of ferrous chloride to ferric chloride in said rising gaseous stream in excess of at least 1:2, condensing substantially all of said ferrous chloride in said upper part of said reactor, and maintaining the velocity of said rising gaseous stream at such rate to settle a preponderant proportion of said entrained particles to said bed.

10. A process according to claim 1 wherein the gaseous stream is cooled by a spray of liquid inert coolant.

11. A process according to claim 1 wherein substantially all the ferrous chloride in said gaseous stream is condensed.

References Cited in the file of this patent

UNITED STATES PATENTS 2,701,179   McKinney _____ Feb. 1, 1955

FOREIGN PATENTS 762,583   Great Britain _____ Nov. 28, 1956
1,147,508   France _____ June 11, 1957

OTHER REFERENCES

Mellor, "Comprehensive Treatise on Inorganic and Theoretical Chemistry," vol. 14, p. 22 (1935). Published by Longmans, Green and Co., New York, N.Y.

UNITED STATES PATENT OFFICE
CERTIFICATE OF CORRECTION

Patent No. 3,067,005　　　　　　　　　　　　　　December 4, 1962

Earl W. Nelson et al.

It is hereby certified that error appears in the above numbered patent requiring correction and that the said Letters Patent should read as corrected below.

Column 1, line 22, for "oxide" read -- oxidic --; column 3, line 28, for "Condenation" read -- Condensation --; column 4, line 3, for "chlorde" read -- chloride --; column 5, line 64, for "form and a major proportion of the bed undersize" read -- represent specific embodiments of the invention and are --.

Signed and sealed this 14th day of May 1963.

(SEAL)
Attest:

ERNEST W. SWIDER
Attesting Officer

DAVID L. LADD
Commissioner of Patents